United States Patent [19]

Schwarz

[11] Patent Number: 4,910,732
[45] Date of Patent: Mar. 20, 1990

[54] ONECHIP-COMPUTERS AS NETWORK-CONTROLLER AND COMPUTER

[76] Inventor: Siegfried Schwarz, Oberer Panorama Weg 4, D-7562 Gernsbach/Baden, Fed. Rep. of Germany

[21] Appl. No.: 649,372

[22] Filed: Sep. 11, 1984

[30] Foreign Application Priority Data

Sep. 20, 1983 [DE] Fed. Rep. of Germany ....... 3333847

[51] Int. Cl.⁴ .............................................. H04J 3/02
[52] U.S. Cl. .................................. 370/85.1; 340/825.5
[58] Field of Search ...................... 370/85, 94, 940, 86; 340/825.5, 825.51

[56] References Cited

U.S. PATENT DOCUMENTS

| | | | |
|---|---|---|---|
| 4,063,220 | 12/1977 | Metcalfe et al. | 370/85 |
| 4,136,384 | 1/1979 | Okada et al. | 370/86 |
| 4,210,780 | 7/1980 | Hopkins et al. | 370/86 |
| 4,332,027 | 5/1982 | Malcolm et al. | 370/94 V |
| 4,365,331 | 12/1982 | Biba et al. | 340/825.5 |
| 4,380,761 | 4/1983 | Boggs | 370/85 |
| 4,441,162 | 4/1984 | Lillie | 370/85 |
| 4,573,045 | 2/1986 | Galin | 370/85 |

OTHER PUBLICATIONS

S. A. Money, "Microprocessor Data Book", 1982, pp. 54–56.

Primary Examiner—Benedict V. Safourek
Assistant Examiner—Wellington Chin
Attorney, Agent, or Firm—Dennison, Meserole, Pollack & Scheiner

[57] ABSTRACT

A network for onechip-computers with its network-driver comprises a process, with which the onechip-computer works independent as a computer at its place and additionally as a network-controller with its serial transmitter, serial receiver.

10 Claims, 3 Drawing Sheets

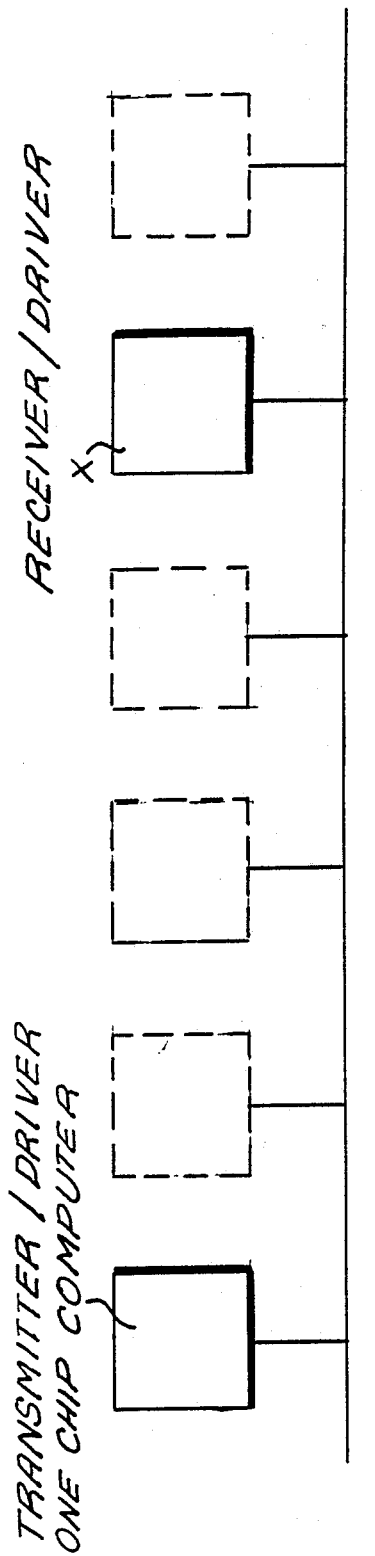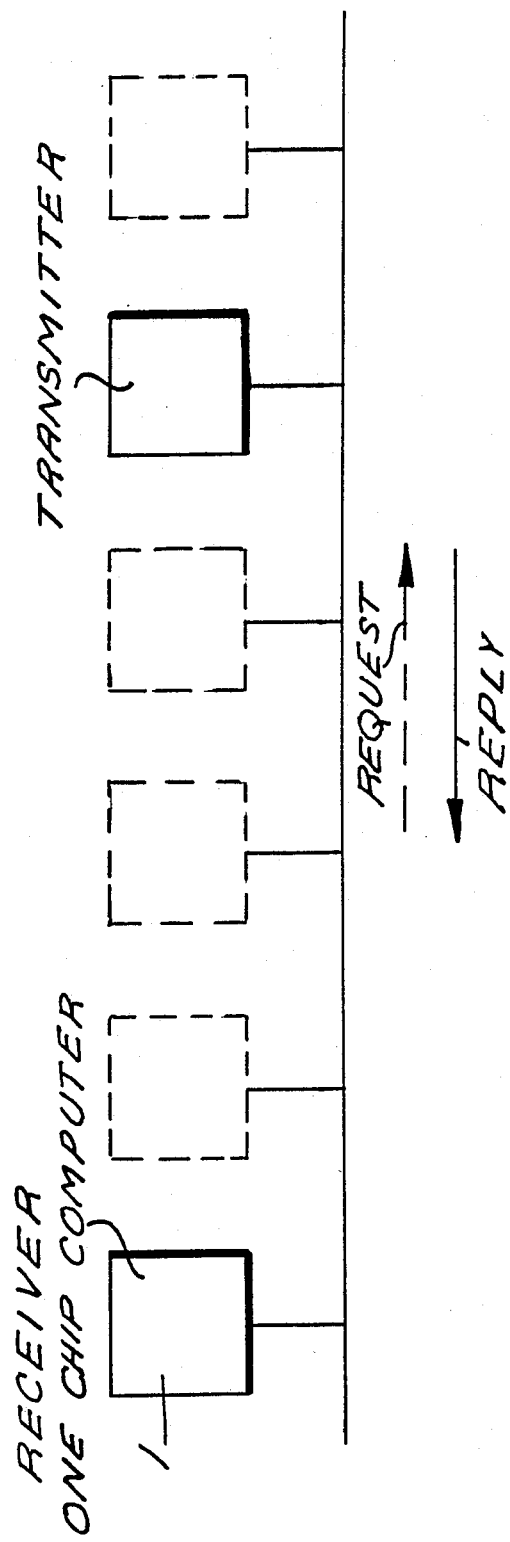

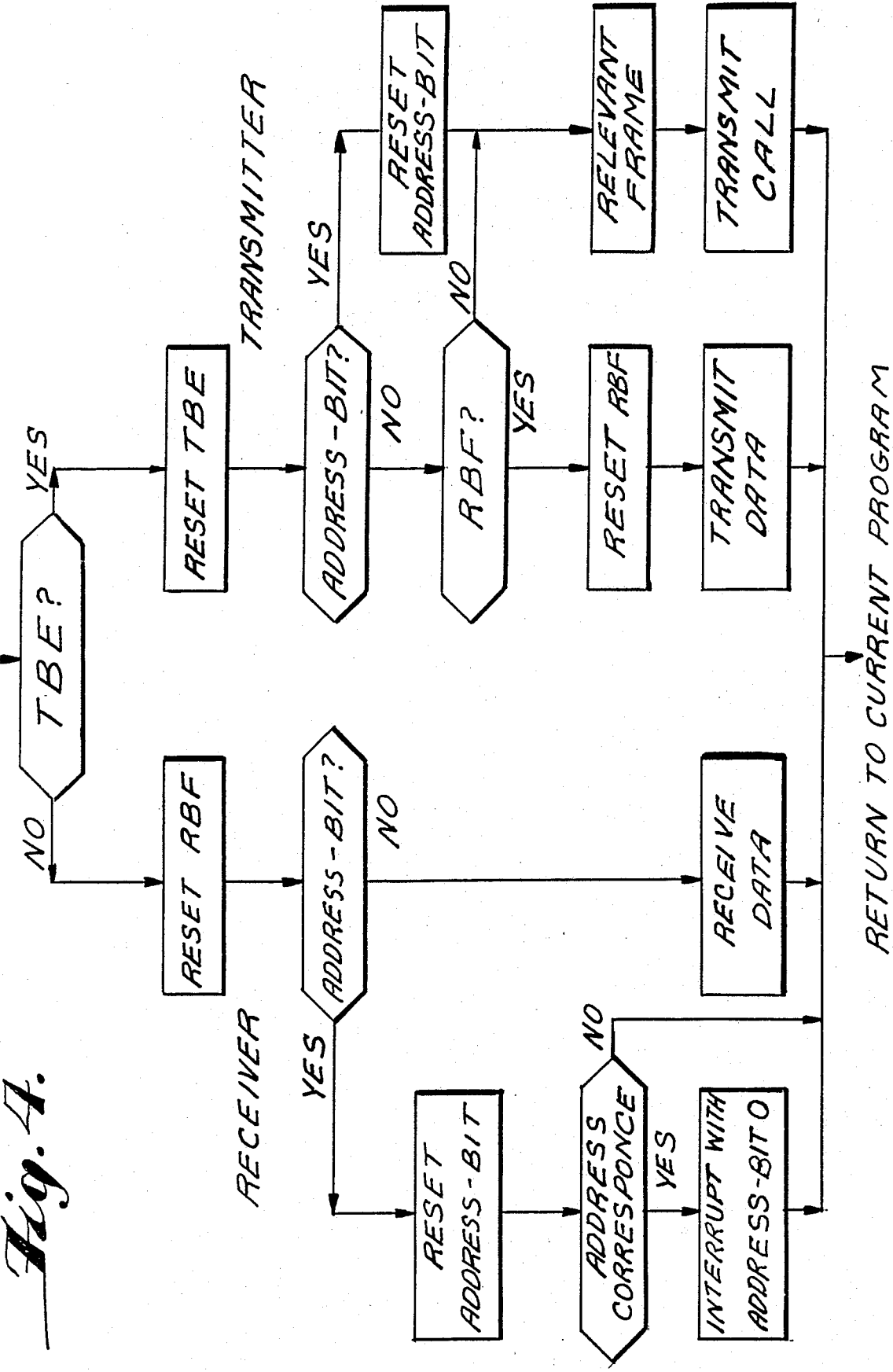

ONECHIP-COMPUTERS AS NETWORK-CONTROLLER AND COMPUTER

BACKGROUD OF THE INVENTION

Several types of networks are known. They differ in the manner to get the right to transmit over the network. Ethernet uses the CSMA/CD-method (carrier sense multiple access with collision detection). For a network access, each node desiring access to the network clarifies in a first waiting time, whether the network is free or not, and gets after a second random time, which determines the transmitter priority, the right to transmit up to 1500 data bytes. During the network access, if there is a collision of two or more transmitting onechip-computers, or if the data transmission contains errors, data transmission is not repeated immediately, but randomly may be after other data transmission. All nodes have the same chance (multiple access) without priority classes. (See: The complete VLSI LAN solution from INTEL Order No. 210783-001). Arcnet uses the token-passing method. For network access, one node after the other gets the right to transmit up to 512 data bytes. Those nodes which do not desire to transmit a message transfer the right to transmit (token) to the next node. The network is always busy, even without data transmission. If the right to transmit (token) over the network is lost, the active nodes will detect that automatically in an own procedure. The known networks and their variants need for a network communication, in addition to the computer, at least a hardware network controller, a network driver, a code converter, and a temporary memory as additional IC components. (See: Elektronik Praxis No. 3, Mar. 1984, Pages 8–14. Byte Publications Inc., May 1983, Pages 60–79).

The onechip-computer INTEL 8051 contains, like the local network controllers 82586 from INTEL for Ethernet or Com 9026 from SMC for Arcnet, a serial transmitter and a serial receiver. The onechip-computer INTEL 8051 further contains a transmitter buffer for one data word and a receiver buffer for two data words. The transmitter and the receiver of the onechip-computer INTEL 8051 is controlled by one interrupt with the interrupt sources "transmitter buffer empty or receiver buffer full". The onechip-computer INTEL 8051 transmits and receives the serial message in data word portions coded in the NRZ code. Each data word contains a start-bit which is 0, nine data bits and one stop bit which is 1. The data words will be synchronized with their start bits. In order to distinguish an address from a data byte, the 9th data bit is used as an address identification bit. With the address identification bit 1, the data word is an address with the address identification bit 0, the data word is a data byte. The interrupt control of the serial receiver is so convertible that it may be triggered by an address with an address identification bit 1 or a data byte with an address identification bit 0. Each onechip-computer INTEL 8051 may cause an address interrupt control in any other onechip-computer INTEL 8051 to check whether the data words following the address are determined for it. This design is one prerequisite to link onechip-computer INTEL 8051 to the network. (See: Microcontroller User's Manual from INTEL. Order No. 210 359, Pages 6–16 to 6–27).

The use of a network driver, including a transmitter collision detector according to German published application 33 13 240, is a second prerequisite to link onechip-computers INTEL 8051 with equal priorities given by the CSMA/CD method or the token-passing method to the network.

SUMMARY OF THE INVENTION

The object of the invention is a network for onechip-computers.

Some onechip-computers have as network-controllers a serial transmitter, receiver, which interrupt-controlled distinguishes between addresses and data. Such onechip-computers are connected at a network about its special network-driver.

According to the invention, this network is achieved by use of a process in the onechip-computers, with which the onechip-computers work independent as a computer at its place and additionally, as a network-controller at a network after known rules, for instance, the CSMA/CD method like Ethernet.

BRIEF DESCRIPTION OF THE DRAWINGS

FIG. 1 is a diagram illustrating one mode of communication between individual computers of a computer network.

FIG. 2 is a diagram similar to FIG. 1, but illustrating communication between computers of a computer network in accordance with the present invention.

FIGS. 3 and 4 are flow charts showing the operation of the present invention.

DESCRIPTION OF THE PREFERRED EMBODIMENT

Figure 3:
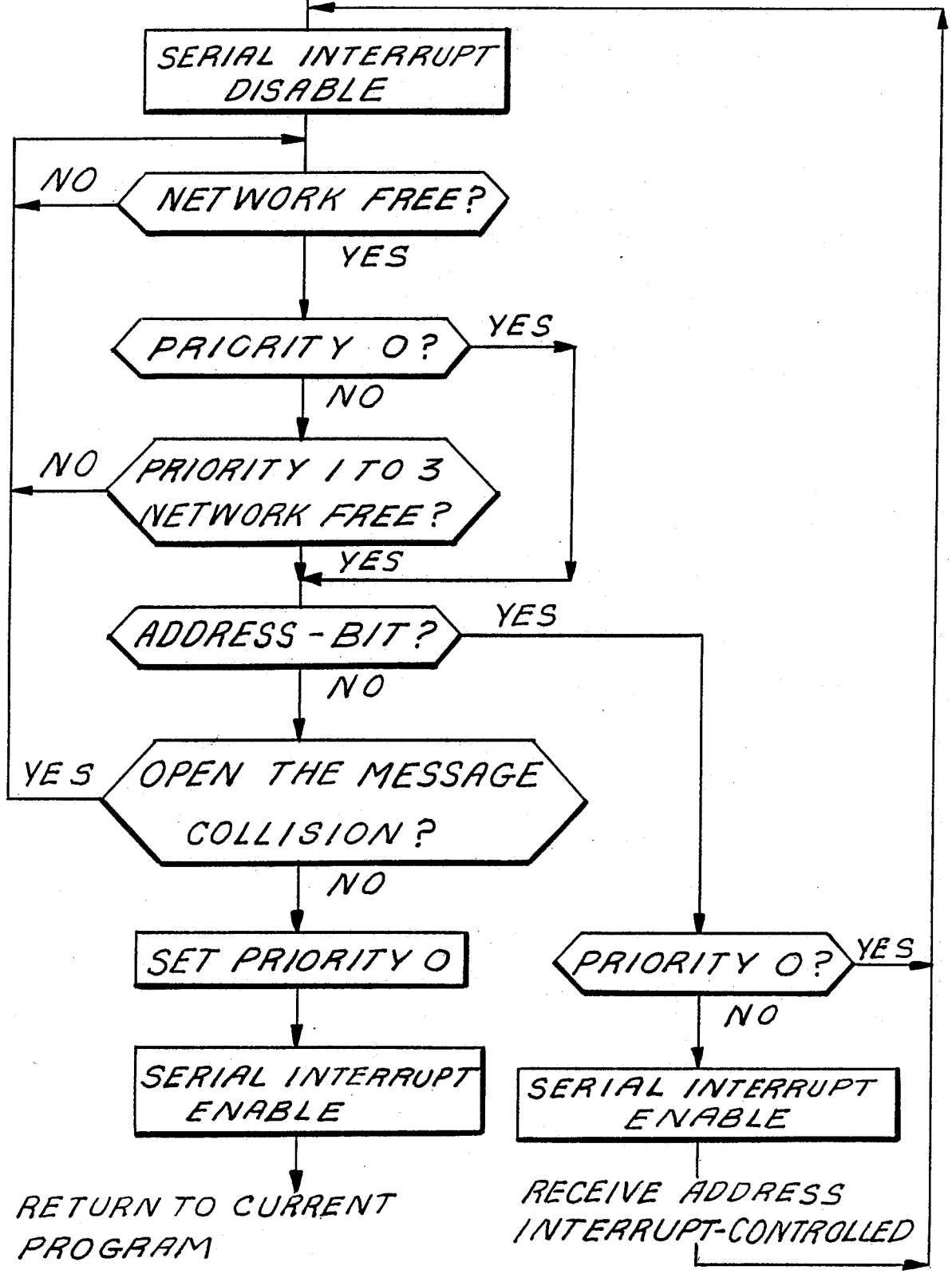

According to the invention, in principle, onechip-computers, as INTEL 8051, with its serial transmitter and receiver are connected in a network via a network driver. In a first mode, the onechip-computer having just one interrupt for the serial transmitter and receiver works as a freestanding processing station and, additionally, as its network controller, for instance, according to the rules of the CSMA/CD method. The advantage of the invention is that smallest onechip-computers which work independent on normal jobs may be linked to a network, like big main frame computers, with only one additional IC component - the network driver.

The method to use onechip-computers either as a computer on normal jobs, or as its own network controller will now be explained in connection with onechip-computers INTEL 8051. These onechip-computers work software controlled freestanding processing stations in a first mode and may communicate through a network driver and the communication bus with other onechip-computers. According to the figures, a onechip-computer initiates a transmission by a header and data or only a header to another onechip-computer upon receipt of a transmission command contained in the main or interrupt programs currently under process. The transmission request opens the message, for instance, according to the rules of the CSMA/CD method, by transmitting the header containing at least the destination and source address. According to the CSMA/CD method, all onechip-computers have the same right (priority 1 to 3). A receiver has priority before its transmitter; thus, the transmission request will be interrupted if the receiver 16 has to receive a message. If during the transmission request, a collision of messages of two or more computers occur, the transmission is interrupted and resumed by the rules of the CSMA/CD method. Without any transmission collision, the transmission request will be completed and the transmitting onechip-computer gets the highest priority 0 as a master above all other onechip-computers and its receiver, until the data transmission is completed. After that, the onechip-computer returns to the program which initialized the transmisson request.

Transmitting of data words following the header occurs interrupt controlled whenever a transmitter buffer is empty. Each transmitted data word will be checked for errors, specifically by the rules of the CSMA/CD method for transmission collision. In case of an error, the transmitting computer repeats some data words by reopening the messages with the relevant header in a new transmission request until the message has been transmitted completely. After transmission of the programmed number of data words, the high priority 0 of the transmitting onechip-computer at the network will be reduced to the low priority 1 to 3.

A onechip-computer working software-controlled as a freestanding processor on its jobs receives a message from another onechip-computer interrupt-controlled without any preparation. The received destination address generates with the address identification bit 1 an interrupt, causing the onechip-computer to compare the received destination address with their individual addresses. Without correspondence, the onechip-computers return to their interrupted jobs. In case of identity, data words will be received interrupt-controlled with address identification bit 0 and receiver buffer full, for instance, according to the rules of CSMA/CD method. The receiver works at the network as a slave. If the onechip-computer having received the header and possibly data immediately has to acknowledge receipt of the data or a data answer (FIG. 2), it takes over the high priority 0 from the received type of transmission in that message from the transmitting onechip-computer which requested the acknowledgment of receipt or answer. The onechip-computer replying has highest priority 0 above all other onechip-computers. The transmitting of the acknowledgment or data answer occurs in the same manner as transmitting a message beginning with the transmission request.

To accomplish such a network control with onechip-computers by the rules of CSMA/CD method, it is necessary to safely detect transmission collisions of two or more onechip-computers. When transmitting of a header or data words according to the rules of the CSMA/CD method, each word will be checked for transmission collision independent of the manner of transmitting with the transmission request or interrupt-controlled. When the collision detector in the network driver recognizes a transmission collision, the transmitted header or data words fed back to its own receiver will be interrupted for at least one word and the collision detector inserts logic 1's for the total word. With the transmitting of each new data word, the last transmitted data word, fed-back and received through the network driver of its own receiver will be checked. In case of identity, there is no transmission collision. In case of collision, the inserted logic 1's from the collision detector change the fed-back and received data word dependent on the moment of the transmission collision. Using the NRZ code, three cases are to consider. (1) The address identification bit is 1; (2) all data bits of the data word and the address identification bit are 1; (3) the start bit and all data bits are 1. These three cases lead to the following three criterias. (a) the address bit is not 0; (b) the start bit is not 0 or appears delayed, while the receiver buffer does not or still does not report full; (c) the eight received data bits are not identical with the transmitted data bits. The transmission collision will be recognized surely, if at least one of the two criterias address bit 0 and receiver buffer full is absent. The identity of the eight data bits is a further indication, but not definitive since all eight data bits may be 1. These three criterias will be used to recognize transmission collision in the onechip-computer. With these criterias, the serial multimaster link of onechip-computers is possible even over large distances, similar to Ethernet.

Other local networks need for the transmission, the protocol, the network free-check and the data securing an additional hardware network controller. The onechip-computer INTEL 8051 does these tasks by itself. On the one hand, the features of a network controller will be accomplished in the onechip-computer interrupt software-controlled by known rules, for instance the CSMA/CD method, particularly:

the collision check;
the network free check and its waiting time, which determines the priority of the network access;
the used protocol;
the data securing;
the reaction to a transmission failure;
the type of transmission with commands for data branching;
broadcasting;
acknowledgment of received data;
data answer;
the reaction to an interrupt with higher priority than the network controller in the transmitter or receiver.

On the other hand, the onechip-computer performs software-controlled its normal jobs as a freestanding unit.

TRANSMISSION PROTOCOL

The transmission protocol of the onechip-computer may be as follows:

Before a message is transmitted, it is checked with the CSMA/CD method whether the network is free.

The transmission begins with the transmission request of the transmitter of a onechip-computer who is addressing the receivers with the destination address having an address bit identification 1. In all other cases, the address identification bit is 0.

The addressed receiver is told with the source address which transmitting onechip-computer is addressing it.

The type of transmission tells the transmitting and the receiving onechip-computers how the following data have to be processed and whether the addressed onechip-computer has to reply.

The transmitter and the receiver will have assigned a 16 bit address each to start the data transmission.

The number ($\leq 240$) of data bytes+checksums tells the transmitter and the receiver(s) how long the message is and when checksums will be transmitted. Whenever the number is $\times$ O H, it is a checksum.

The data are preceded by the header.

The transmission program of the data is an interrupt routine, which is called for if the transmitter buffer is empty.

The data are transmitted in portions of $\leq 15$ data bytes. The portions are separated by checksums. The first checksum is that for the header. All following checksums are calculated only from their preceding data portion. If the number is not dividable by 15, the remainder portion is transmitted first.

In a data message:

15 portions with 15 data bytes each + 15 checksums may be transmitted. This results in a number of 240 databytes without the header and the stop byte.

The message end is indicated by the stop byte OOH.

TRANSMISSION PRIORITY

Transmission priorities are granted according to the CSMA/CD method.

With transmitting of a message, the access to the network is distinguished, for instance, by four priorities. The priority of a onechip-computer desiring to transmit is determined by the waiting time after which the transmitting computer checks whether the network is free.

Transmitting begins with a low random priority 1 to 3. The waiting times to the priorities 1 to 3 are changed by a random generator so that a multiple transmission collision of two or more transmitting computers is reduced. With progressing transmission, the priority raises, such that the transmitting onechip-computer gets highest priority 0 above all others as a master in order to enable it to safely complete the current transmission even when collisions occur. For instance, after transmitting the source address, the low priority 1 to 3 may raise to the highest priority 0.

If a transmitter is disturbed with its current transmission by another beginning transmitter, both their transmissions are stopped. Both are now checking during their waiting time whether the network is free. The transmitter with the higher priority gets access to the free network.

The collision of two or more transmitting onechip-computers at the network makes the repetition of the last data words necessary. To avoid errors, the last portion with its checksum, at least two data words are repeated and the message is opened anew with the relevant header.

In those cases where the requesting computer is waiting for a reply of the receiving computer, the latter is replying immediately after the stop byte with the highest priority 0. The receiving computer takes over the highest priority 0 from the preceding received message. After a broadcasting with a destination address 0, an acknowledgment or a data answer is excluded because each receiving computer would react.

PROTOCOL OF THE RECEIVING COMPUTER

The receiving protocol of a onechip-computer may be as follows:

The receiving of a message is interrupt-controlled when the receiver buffer is full.

The destination address is checked in the receiver of all onechip-computers. If it corresponds with the individual address of the receiving onechip-computer, the following header and data are also received interrupt-controlled. If it does not correspond, the interrupted main or interrupt program is continued.

The following source address indicates which onechip-computer is transmitting the message. With the source address, the requested receiving computer is able to reply.

The following 'type of transmission' determines how the transmitting and the receiving computers have to work on the data and whether the requested receiving computer has to reply:

16 bit address for the transmitting and the receiving computers are used.

Next, the number ($\leq 240$) of data bytes + checksums is transmitted.

Then, data are transmitted in portions of $\leq 15$ data bytes. After each portion, the checksum of the preceding data byte(s) is transferred. If the calculated checksum in the receiving computer does not correspond with the received checksum, the called receiving computer transmits a collision byte FFH with the address bit 0 which triggers a transmission collision in the transmitting computer and causes the repetition of the preceding data portion according to the CSMA/CD method. The end of message is indicated by the stop byte OOH. Now, if requested, the receiving computer may reply to the transmitting computer immediately.

TYPE OF TRANSMISSION

The type of transmission determines how the data in the transmitting and receiving computers are to be processed and whether the receiving computer has to reply to the transmitting computer. The type of transmission includes the following ten commands:

the reading in the transmitting from the internal or external data memory of the onechip-computer;

the writing from the receiver into the internal or external data memory of the onechip-computer;

the write address in the receiving computer which determines the receiver address from the transmitting computer or the receiving computer with the type of transmission from the transmitting computer;

the receiving computer replies to the requesting transmitting computer with a data answer, or it does not reply;

the receiving computer replies to the data received from the transmitting computer a receipt acknowledgment together with the next receiver address or first transmitter address, or it does not acknowledge the receipt.

The ten commands are mixable. In the onechip-computer INTEL 8051, the access to external data or external programs is in two different address areas. To transfer data and programs both into the same area, the two address areas must be connected to one in a von Neumann-machine.

In FIGS. 1 and 2, the possible types of data transmission are shown. The squares show onechip-computers connected over the network by their network drivers. FIG. 1 shows the transmitting computer 1 as master, which transmits data to the receiving computer which is a slave. The transmitting computer 1 transmits to the receiving computer the first receiver address, the first transmitter address, the number of data + checksums and the type of transmission with which the network is starting the data transmission from the chosen transmitter memory point to the chosen receiver memory point. The data are transferred with the header from point to point, to the places in the memories the programmer has decided. The type of transmission determines the selected internal or external memories in the transmitting and receiving computers. The used address in the receiving computer may be from the transmitting or the receiving computer; this decides the programmer with the type of transmission.

FIG. 2 shows the transmitting computer 1 which transmits the header and data or only the header to the receiving computer and requests a reply with the type of transmission. The receiving computer replies to the data of the transmitting receiver 1 according to the header request its data answer. The acknowledgment receipt or data answer is transmitted from the receiving computer as a master to the transmitting computer 1 as now a slave. The receiving computer works during its reply as the transmitting computer 1 in FIG. 1. If the reply is a data answer, the transmitter address is valid for the receiving computer, the receiver address is valid for the transmitting computer 1. The receiving computer transmits its reply immediately after the requesting message.

FIG. 3 shows the process of the transmit request to open the message by the rules of the CSMA/CD method. FIG. 4 shows the process for further transmitting according to the CSMA/CD method or the receiving interrupt-controlled.

With the transmit request from the current program in FIG. 3, the serial interrupt is disabled. The transmitting computer makes first a network free check for its waiting time. If the network is free, the transmitting computer opens the message. Without transmission collision during the transmit request, the transmitting computer gets the highest priority 0. With a transmission collision, the transmitting computer begins with a new network free check. If the received word is a destination address with an address bit 1, the correspondence of the destination address to the individual address of this onechip-computer is checked and then interrupt-controlled if the priority is not 0. The receiver has priority before its transmitter.

FIG. 4 shows the further transmitting of the opened message interrupt-controlled. If a serial interrupt occurs, the transmitter buffer empty TBE gives the transmitter priority before its receiver. After that, the last transmitted data word is checked for transmission collision. With the address bit 0 and the receiver buffer full RBF, if there is no transmission collision, the next data word is transmitted. With transmission collision, the transmitting computer opens the message a new with the highest priority 0 by a transmit request with a relevant header. If a serial interrupt occurs without a transmitter buffer empty TBE, the data word in the receiver buffer full RBF is from a different transmitting computer. With address bit 1, the word is the destination address. If the destination address corresponds to the individual address of this onechip-computer, the interrupt-control is prepared for further data with the address bit 0. The following data are then received interrupt-controlled.

We claim:

1. A method for operating a plurality of onechip-computers, each including a serial transmitter and a serial receiver each provided with a buffer, connected by a network driver to a communication medium in a local network comprising the steps:
    (a) without any message on the communication medium, said plurality of onechip-computers operate independently from each other on individual jobs;
    (b) each of said plurality of onechip-computers, desiring transmission of a message to another of said plurality of onechip-computers, interrupts its own job and transmits a message header containing at least a destination address of said another onechip-computer which is to receive the message via the communication medium;
    (c) said plurality of onechip-computers are continuously monitoring the communication medium by said network driver for occurrence of an associated individual address which identifies each of said plurality of onechip-computers, respectively, so only that particular said onechip-computer identified by the destination address of the message header interrupts its own job for receiving the message;
    (d) a correct transmission of the message is monitored by each said network driver with an immediate feed-back of words of the transmitted message from an output of said each transmitting onechip-computers to an input of said each transmitting onechip-computers, and any collision of messages caused by several of said plurality of onechip-computers transmitting said message header is recognized, since the fed-back word of the transmitted message will be changed by a bit of any of the other messages present on the communication medium;
    (e) in case of a collision of the transmitted messages, said each transmitting onechip-computers stop transmission and access to the communication medium is given to one of said plurality of onechip-computers according to a priority granting method wherein the first of said plurality of onechip-computers given access has the highest priority and said each transmitting onechip-computers are given priority from one to three based on at least one of the following:
        (1) said onechip-computer is receiving the transmitted message,
        (2) said onechip-computer is requesting data for its own job, or
        (3) said onechip-computer desires transmission of a subsequent message; and
    (f) said one of said plurality of onechip-computers having first achieved access to the communication medium retains highest priority above said each of said plurality of onechip-computers until the end of the message transmitted therefrom.

2. The method of claim 1, wherein said another onechip-computer, upon a request of acknowledgement of a correctly received message, takes over the highest priority of access to the communication medium based on the priority granting method immediately after receipt of the end of the message.

3. The method of claim 1 or 2 wherein the receiving of the transmitted message by said another onechip-computer has priority above transmission of any subsequent message transmitted by said plurality of onechip-computers.

4. The method of claim 1 or 2 wherein an interrupt is caused in the running jobs of a onechip-computer whenever the buffer of the serial transmitter is empty or the buffer of the serial receiver is full.

5. The method of claim 1 or 2 wherein a running job is interrupted in a onechip-computer only when its serial receiver detects the receipt of a destination address whereupon the onechip-computer performs a routine for comparing the received destination address with its associated individual address.

6. The method of claim 5 wherein after the successful transmission of the destination address, the transmitting onechip-computer starts to transmit message-data in portions corresponding to the buffer contents of the serial transmitter in an interrupt sequence by repeatedly filling the buffer of the serial transmitter.

7. The method of claim 1 or 2 wherein the priority granting method is a CSMA/CD method.

8. The method of claim 1 or 2 wherein the message is portioned into words comprising a start-bit of a first logic value, eight data bits, one address identifying bit and a stop bit of a second logic value.

9. A method for operating a plurality of onechip-computers, each including a serial transmitter and a serial receiver each provided with a buffer, connected by a network driver to a communication medium in a local network comprising the steps:

(a) without any message on the communication medium, said plurality of onechip-computers operate independently from each other on individual jobs;

(b) each of said plurality of onechip-computers, desiring transmission of a message to another of said plurality of onechip-computers, interrupts its own job and transmits a message header containing at least a destination address of said another onechip-computer which is to receive the message via the communication medium;

(c) said plurality of onechip-computers are continuously monitoring the communication medium by said network driver for occurrence of an associated individual address which identifies each of said plurality of onechip-computers, respectively, so only that particular said onechip-computer identified by the destination address of the message header interrupts its own job for receiving the message;

(d) a correct transmission of the message is monitored by each said network driver with an immediate feedback of words of the transmitted message from an output of said each transmitting onechip-computers to an input of said each transmitting onechip-computers, and any collision of messages caused by several of said plurality of onechip-computers transmitting said message header is recognized, since the feed-back word of the transmitted message will be changed by a bit of any of the other messages present on the communication medium;

(e) in case of a collision of the transmitted messages, said each transmitting onechip-computers stop transmission and access to the communication medium is given to one of said plurality of onechip-computers according to a priority granting method wherein the first of said plurality of onechip-computers given access has the highest priority;

(f) said one of said plurality of onechip-computers having first achieved access to the communication medium retains highest priority above said each of said plurality of onechip-computers until the end of the message transmitted therefrom; and wherein the message comprises the header containing the destination address, source address, a type of transmission portion, a receiver address for writing in a random access memory area, a transmitter address for reading from a random access memory area, a number-of-data portions word for determining how many data-portions are to be transferred, a check-sum for the header, a number of data portions each followed by the check-sums and a message stop-byte.

10. The method of claim 9 wherein each data portion contains up to 15 data bytes and is followed by its check-sum, and the receiver calculates check-sums from received data and compares them with the received check-sums, a collision byte being transmitted by the receiver if check-sums do not equal, the collision byte initiating a state of collision and causing the transmitting onechip-computer to resume transmitting the message by repeating the incorrect portion.

* * * * *